(12) United States Patent
Takeuchi et al.

(10) Patent No.: US 9,540,739 B2
(45) Date of Patent: Jan. 10, 2017

(54) HIGH DIFFERENTIAL PRESSURE WATER ELECTROLYSIS SYSTEM AND METHOD FOR STARTING THE SAME

(71) Applicant: HONDA MOTOR CO., LTD., Tokyo (JP)

(72) Inventors: Jun Takeuchi, Wako (JP); Aoi Miyake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 327 days.

(21) Appl. No.: 14/515,528

(22) Filed: Oct. 16, 2014

(65) Prior Publication Data

US 2015/0108005 A1    Apr. 23, 2015

(30) Foreign Application Priority Data

Oct. 23, 2013  (JP) .................................. 2013-219720

(51) Int. Cl.
  *C25B 1/12*  (2006.01)
  *C25B 15/08* (2006.01)
(52) U.S. Cl.
  CPC .................. *C25B 1/12* (2013.01); *C25B 15/08* (2013.01); *Y02E 60/366* (2013.01)
(58) Field of Classification Search
  CPC .................... C25B 1/12; C25B 15/08
  See application file for complete search history.

(56) References Cited

U.S. PATENT DOCUMENTS

| 2012/0255868 A1* | 10/2012 | Takeuchi | C25B 1/12 205/628 |
| 2012/0298520 A1* | 11/2012 | Takeuchi | C25B 15/02 205/335 |
| 2015/0060293 A1* | 3/2015 | Takeuchi | C25B 1/12 205/338 |

FOREIGN PATENT DOCUMENTS

JP    2002-129372    5/2002

* cited by examiner

*Primary Examiner* — Nicholas A Smith
(74) *Attorney, Agent, or Firm* — Mori & Ward, LLP (57) ABSTRACT

A high differential pressure water electrolysis system includes a high differential pressure water electrolysis device, a water supply tank, a high pressure gas-liquid separator, a hydrogen outlet line, a drain line, a low pressure gas-liquid separator, a water return line, and a pressure maintaining mechanism. The drain line is to drain a liquid water separated by the high pressure gas-liquid separator. The low pressure gas-liquid separator is disposed in the drain line and has a discharge line via which a gas separated by the low pressure gas-liquid separator is to be discharged. The water return line connects the low pressure gas-liquid separator and the water supply tank. The pressure maintaining mechanism is disposed in the discharge line and configured to maintain a pressure in the low pressure gas-liquid separator to be higher than a pressure in the water supply tank.

7 Claims, 5 Drawing Sheets

HIGH DIFFERENTIAL PRESSURE WATER ELECTROLYSIS SYSTEM AND METHOD FOR STARTING THE SAME

CROSS-REFERENCE TO RELATED APPLICATIONS

The present application claims priority under 35 U.S.C. §119 to Japanese Patent Application No. 2013-219720, filed Oct. 23, 2013, entitled "High Differential Pressure Water Electrolysis System and Method for Starting The Same." The contents of this application are incorporated herein by reference in their entirety.

BACKGROUND

1. Field

The present disclosure relates to a high differential pressure water electrolysis system and a method for starting the high differential pressure water electrolysis system.

2. Description of the Related Art

In general, hydrogen is used as fuel gas which is used for power generation reaction in a fuel cell. The hydrogen is produced by a water electrolysis device, for example. The water electrolysis device uses a solid polymer electrolyte membrane (ion exchange membrane) in order to generate hydrogen (and oxygen) by electrolyzing water. Electrode catalyst layers are provided on both surfaces of a solid polymer electrolyte membrane so as to form an electrolyte membrane-electrode assembly, and power supplying bodies are disposed on both sides of the electrolyte membrane-electrode assembly so as to form a unit cell.

For a cell unit in which multiple unit cells are stacked, a voltage is applied to both ends of the cell unit in the stacking direction, and water is supplied to the power supplying bodies on the anode side. Accordingly, on the anode side of the electrolyte membrane-electrode assembly, water is electrolyzed to generate hydrogen ions (protons), which move to the cathode side through the solid polymer electrolyte membranes and combine with electrons, thereby producing hydrogen. On the other hand, on the anode side, oxygen generated along with hydrogen is discharged from the cell unit with excessive water.

For example, in the hydrogen and oxygen supply system disclosed in Japanese Unexamined Patent Application Publication No. 2002-129372, in order to supply pure water to an electrolysis tank provided with a water electrolysis device, a pure water tank is connected to the electrolysis tank via a pure water supply piping unit. Hydrogen gas generated by the water electrolysis device in the electrolysis tank is sent to a hydrogen separation tank along with some pure water via a hydrogen gas transport piping unit.

The hydrogen separation tank is provided with a pure water return piping unit in order to return water to the pure water tank, the water from which hydrogen is separated in the hydrogen separation tank. In the pure water return piping unit, a hydrogen dehumidifier is disposed, and a hydrogen discharge piping unit is connected to the hydrogen dehumidifier.

SUMMARY

According to one aspect of the present invention, a high differential pressure water electrolysis system includes a high differential pressure water electrolysis device, a water supply tank, a high pressure gas-liquid separator, a hydrogen outlet line, a drain line, a low pressure gas-liquid separator, a water return line, and a pressure maintaining mechanism. The high differential pressure water electrolysis device is configured to electrolyze water to generate oxygen and high pressure hydrogen which has a pressure higher than a pressure of the oxygen. The water supply tank is to store the water to be supplied to the high differential pressure water electrolysis device. The high pressure gas-liquid separator is to separate liquid from the high pressure hydrogen output from the high differential pressure water electrolysis device. The hydrogen outlet line connects the high differential pressure water electrolysis device and the high pressure gas-liquid separator. The drain line is to drain a liquid water separated by the high pressure gas-liquid separator. The low pressure gas-liquid separator is disposed in the drain line and has a discharge line via which a gas separated by the low pressure gas-liquid separator is to be discharged. The water return line connects the low pressure gas-liquid separator and the water supply tank. The pressure maintaining mechanism is disposed in the discharge line and configured to maintain a pressure in the low pressure gas-liquid separator to be higher than a pressure in the water supply tank.

According to another aspect of the present invention, in a method for starting a high differential pressure water electrolysis system, the high differential pressure water electrolysis system includes a high differential pressure water electrolysis device, a water supply tank, a high pressure gas-liquid separator, a hydrogen outlet line, a drain line, a low pressure gas-liquid separator, a water return line, and a pressure application line. The high differential pressure water electrolysis device is configured to electrolyze water to generate oxygen and high pressure hydrogen which has a pressure higher than a pressure of the oxygen. The water supply tank is to store the water to be supplied to the high differential pressure water electrolysis device. The high pressure gas-liquid separator is to separate liquid from the high pressure hydrogen output from the high differential pressure water electrolysis device. The hydrogen outlet line connects the high differential pressure water electrolysis device and the high pressure gas-liquid separator. The drain line is to drain a liquid water separated by the high pressure gas-liquid separator. The low pressure gas-liquid separator is disposed in the drain line. The water return line connects the low pressure gas-liquid separator and the water supply tank. The pressure application line connects a midpoint of the hydrogen outlet line and the low pressure gas-liquid separator. Whether or not a pressure in the low pressure gas-liquid separator is lower than a pressure in the water supply tank is determined. The high pressure hydrogen output from the high differential pressure water electrolysis device is introduced into the low pressure gas-liquid separator through the pressure application line when it is determined that the pressure in the low pressure gas-liquid separator is lower than the pressure in the water supply tank. The water return line is opened to return water in the low pressure gas-liquid separator to the water supply tank when it is determined that the pressure in the low pressure gas-liquid separator is higher than the pressure in the water supply tank.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
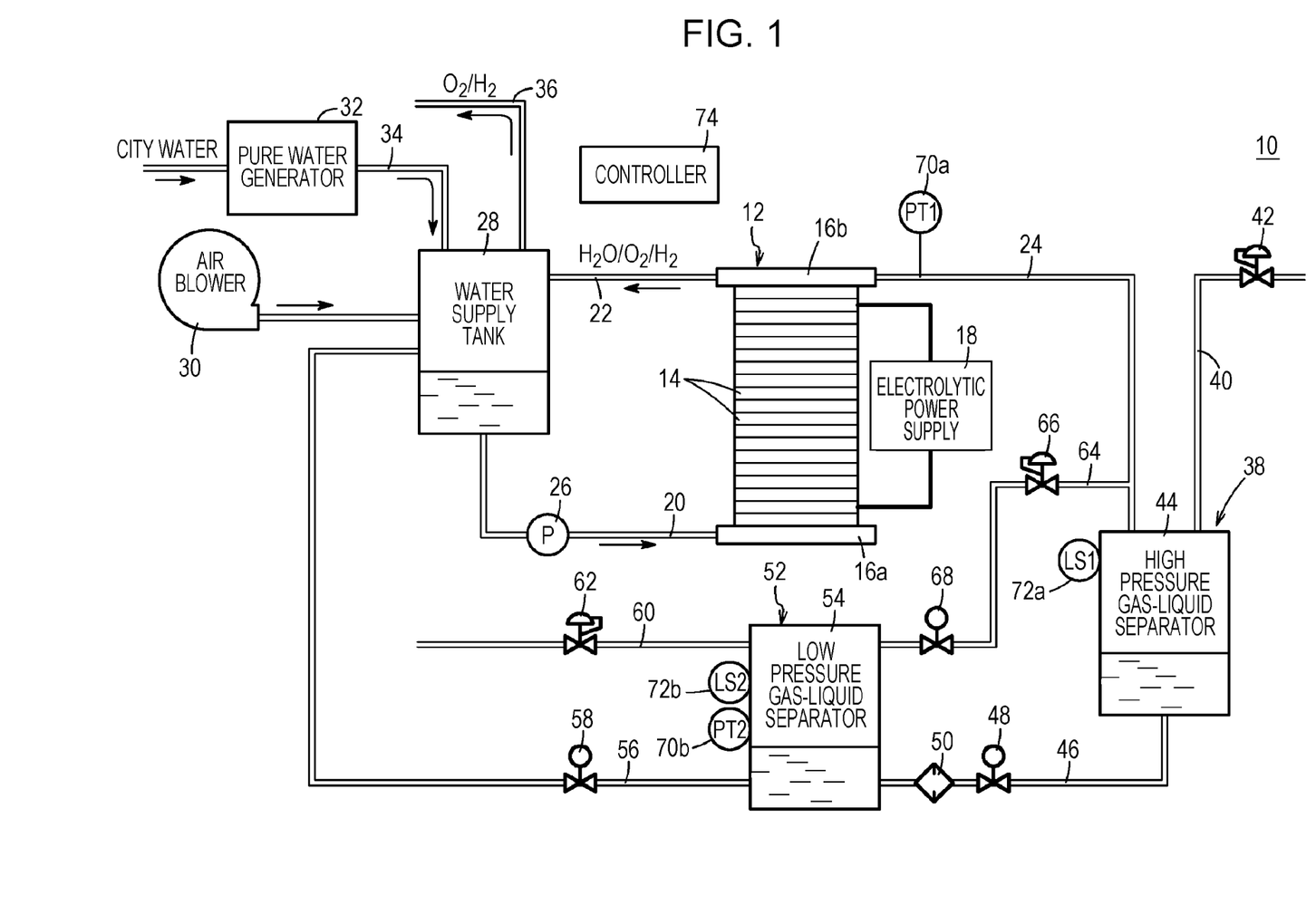
FIG. 1 is a schematic configuration explanatory diagram of a high differential pressure water electrolysis system according to an embodiment of the present disclosure.

As illustrated in FIG. 1, a high differential pressure water electrolysis system 10 according to an embodiment of the present disclosure includes a high differential pressure water electrolysis device 12. The high differential pressure water electrolysis device 12 generates oxygen and high pressure hydrogen (hydrogen having a pressure of, for example, 1 to 70 MPa higher than an oxygen pressure which is a normal pressure) by electrolyzing water (pure water).

A plurality of water electrolysis cells 14 is stacked in the high differential pressure water electrolysis device 12, and both ends of the water electrolysis cells 14 in the stacking direction are provided with end plates 16a, 16b. The high differential pressure water electrolysis device 12 is connected to an electrolytic power supply 18 which is a DC power supply. The end plate 16a is connected to a water supply line 20 that communicates with an anode inlet (water supply inlet) which is not illustrated. The end plate 16b is connected to a water discharge line 22 and a hydrogen outlet line 24, the water discharge line communicating with an anode outlet (where water and generated oxygen are discharged), the hydrogen outlet line communicating with the cathode side (where high pressure hydrogen is generated).

The water supply line 20 is connected to the base of a water supply tank 28 with a circulating pump 26 disposed on the water supply line 20. The upper portion of the water supply tank 28 communicates with an air blower 30 and the water discharge line 22. The water supply tank 28 is connected to a pure water supply line 34 and a gas discharge line 36, the pure water supply line being connected to a pure water generator 32, the gas discharge line for discharging oxygen and hydrogen which are separated from pure water in the water supply tank 28.

The hydrogen outlet line 24 connects the high differential pressure water electrolysis device 12 and a high pressure gas-liquid separator 38. High pressure hydrogen, from which water is separated in the high pressure gas-liquid separator 38, is output as dry hydrogen into a high pressure hydrogen supply line 40. The high pressure hydrogen supply line 40 is provided with a back pressure valve 42 that is set at a predetermined pressure value (for example, 70 MPa).

The high pressure gas-liquid separator 38 includes a tank 44 for storing water. The lower portion of the tank 44 is connected to a drain line 46 for draining liquid water which has been separated by the high pressure gas-liquid separator 38. In the direction of the flow of liquid water, the drain line 46 is provided with a first opening and closing valve, for example, a first electromagnetic valve 48, and a drain decompression mechanism, for example, an orifice 50 to allow a predetermined amount of liquid water to flow by applying a pressure loss. Instead of the orifice 50, for example, a decompression valve may be used.

The drain line 46 is connected, downstream of the orifice 50, to a low pressure gas-liquid separator 52 that separates decompressed liquid water from gas. The low pressure gas-liquid separator 52 includes a tank 54 for storing water. The low pressure gas-liquid separator 52 and the water supply tank 28 are connected by a water return line 56. The water return line 56 is provided with a second opening and closing valve, for example, a second electromagnetic valve 58.

The upper side of the low pressure gas-liquid separator 52 is provided with a discharge line 60 that discharges gas (hydrogen) which has been separated in the low pressure gas-liquid separator 52. The discharge line 60 is provided with a pressure maintaining mechanism, for example, a back pressure valve (or check valve) 62 that maintains the pressure in the low pressure gas-liquid separator 52 higher than the pressure in the water supply tank 28. Specifically, the back pressure valve 62 is set at a pressure (for example, 70 kPa) higher than the back pressure (for example, 20 kPa) that acts on the water supply tank 28 when the air blower 30 drives with maximum performance. It is preferable that the pressure setting of the back pressure valve 62 is higher than or equal to the total of the back pressure of the water supply tank 28, the pressure loss in the line, and the differential pressure between high and low pressures.

Some midpoint of the hydrogen outlet line 24 and an upper portion of the low pressure gas-liquid separator 52 are connected by a pressure application line 64. The pressure application line 64 is provided with a decompression mechanism, for example, a decompression valve 66 and a third opening and closing valve, for example, a third electromagnetic valve 68 in the direction of the flow of high pressure hydrogen. The outlet pressure of the decompression valve 66 is set to be higher than the pressure in the water supply tank 28.

The hydrogen outlet line 24 is provided with a first pressure gauge 70a in the vicinity of the high differential pressure water electrolysis device 12, the first pressure gauge being configured to detect a pressure PT1 of hydrogen which is output from the high differential pressure water electrolysis device 12. The low pressure gas-liquid separator 52 is provided with a second pressure gauge 70b that detects a pressure PT2 in the low pressure gas-liquid separator 52.

The high pressure gas-liquid separator 38 is provided with a water level detection mechanism, for example, a first water level detection sensor 72a for detecting a water level LS1 in the tank 44. The low pressure gas-liquid separator 52 is provided with a water level detection mechanism, for example, a second water level detection sensor 72b for detecting a water level LS2 in the tank 54.

A controller 74 receives an input of a detection signal from each of the first pressure gauge 70a, the second pressure gauge 70b, the first water level detection sensor 72a, and the second water level detection sensor 72b. The controller 74 performs operation control of the entire high differential pressure water electrolysis system 10.

The operation of the high differential pressure water electrolysis system 10 configured in this manner will be described in the following.

The operation of the circulating pump 26 causes the pure water in the water supply tank 28 to be supplied via the water supply line 20 to the anode inlet of the high differential pressure water electrolysis device 12. On the other hand, a voltage is applied to the high differential pressure water electrolysis device 12 by the electrolytic power supply 18 electrically connected thereto. Thus, pure water is electrolyzed on the anode side in each of the water electrolysis cells 14, thereby generating hydrogen ions, electrons, and oxygen. Consequently, on the cathode side, hydrogen ions combine with electrons to produce hydrogen which is taken through the hydrogen outlet line 24.

On the other hand, near the anode outlet, oxygen generated by a reaction, unreacted water, and passing hydrogen flow, and the mixed fluid of these is discharged to the water discharge line 22. The unreacted water, oxygen, and hydrogen are introduced into the water supply tank 28 to be separated, then water is introduced into the water supply line 20 via the circulating pump 26. The oxygen and hydrogen separated from water are discharged to the outside through the gas discharge line 36.

The hydrogen generated in the high differential pressure water electrolysis device 12 is sent to the high pressure gas-liquid separator 38 through the hydrogen outlet line 24. In the high pressure gas-liquid separator 38, liquid water contained in hydrogen is separated from the hydrogen and stored in the tank 44. On the other hand, the hydrogen is sent out to the high pressure hydrogen supply line 40. After the pressure of the hydrogen is increased to the pressure setting (for example, 70 MPa) of the back pressure valve 42, the hydrogen is dehumidified by a dehumidifier or the like (not illustrated) to become dry hydrogen (product hydrogen) which is supplied to a fuel cell electric vehicle.

In the high pressure gas-liquid separator 38, the water level LS1 in the tank 44 increases. When the water level LS1 detected by the first water level detection sensor 72a increases to a predetermined upper limit water level threshold value, the controller 74 opens the first electromagnetic valve 48. Consequently, as illustrated in FIG. 2, the liquid water in the tank 44 is discharged to the drain line 46, and reduced in pressure due to a pressure loss caused by the orifice 50, then is introduced into the tank 54 which is included in the low pressure gas-liquid separator 52.

Figure 3:
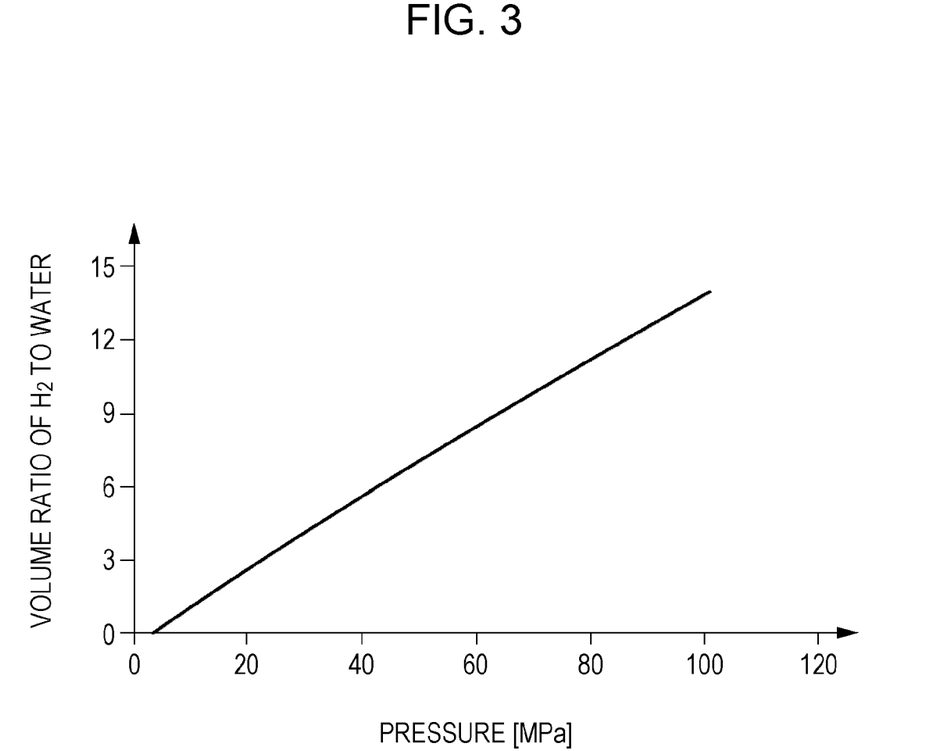
FIG. 3 is an explanatory graph illustrating the relationship between pressure and ratio of dissolved hydrogen in liquid water to the volume of the liquid water.

The liquid water introduced into the tank 54 contains dissolved hydrogen. As illustrated in FIG. 3, the dissolved hydrogen ratio in the liquid water, for example, at 60° C. increases in proportion to pressure. For example, the liquid water having 70 MPa contains dissolved hydrogen which is approximately 12 times the water in volume. Consequently, the dissolved hydrogen is vaporized due to depressurization (decompression) in the low pressure gas-liquid separator 52, and the pressure in the tank 54 increases due to the volume of vaporized hydrogen.

Figure 2:
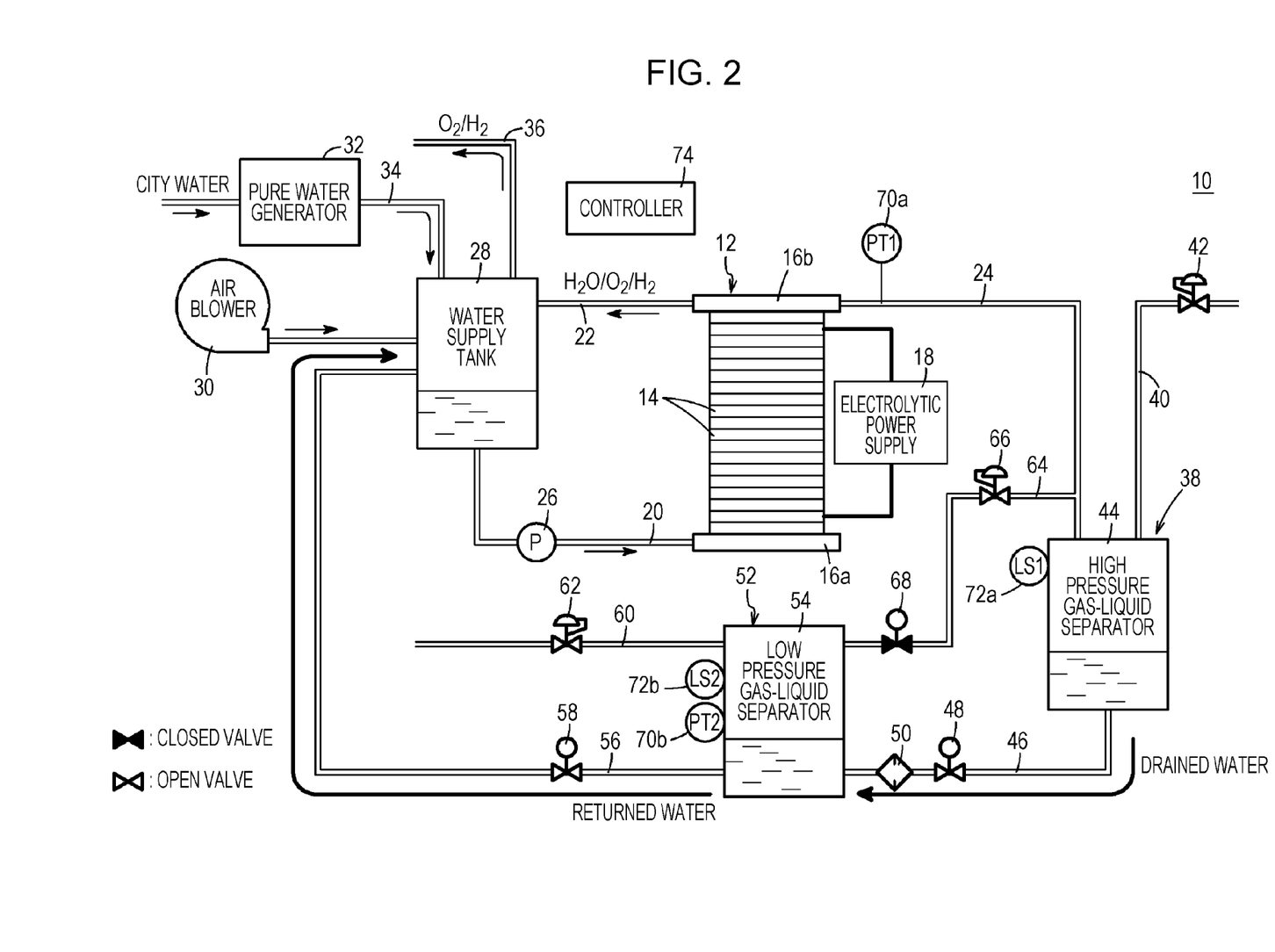
FIG. 2 is an explanatory diagram for the operation of the high differential pressure water electrolysis system.

As illustrated in FIG. 2, the low pressure gas-liquid separator 52 is provided with the discharge line 60 which is provided with the back pressure valve 62. The back pressure valve 62 is set at a pressure (for example, 70 kPa) higher than the back pressure (for example, 20 kPa) that acts on the water supply tank 28 when the air blower 30 drives with maximum performance. Accordingly, the pressure in the tank 54 becomes higher than the pressure in the water supply tank 28, and thus the water in the tank 54 is reliably returned to the water supply tank 28 through the water return line 56. In addition, excessive hydrogen is discharged to the outside by the open valve operation of the back pressure valve 62.

In this case, in the present embodiment, the water (liquid water in which hydrogen is dissolved) separated from gas in the high pressure gas-liquid separator 38 is decompressed by the orifice 50 and supplied to the low pressure gas-liquid separator 52. Thus, the dissolved hydrogen is vaporized in the low pressure gas-liquid separator 52, and the pressure PT2 in the low pressure gas-liquid separator 52 increases. The pressure PT2 in the low pressure gas-liquid separator 52 is maintained higher than the pressure in the water supply tank 28 by the back pressure valve 62.

Therefore, the water in the low pressure gas-liquid separator 52 is easily and reliably returned to the water supply tank 28 due to a pressure difference, and thus it is not necessary to use dedicated equipment and the pressure of the dissolved hydrogen may be utilized. Consequently, the effects are obtained that reuse of water may be achieved easily and cost-effectively, the efficiency of the entire high differential pressure water electrolysis system 10 may be improved, and miniaturization of the high differential pressure water electrolysis system 10 is achieved.

Figure 4:
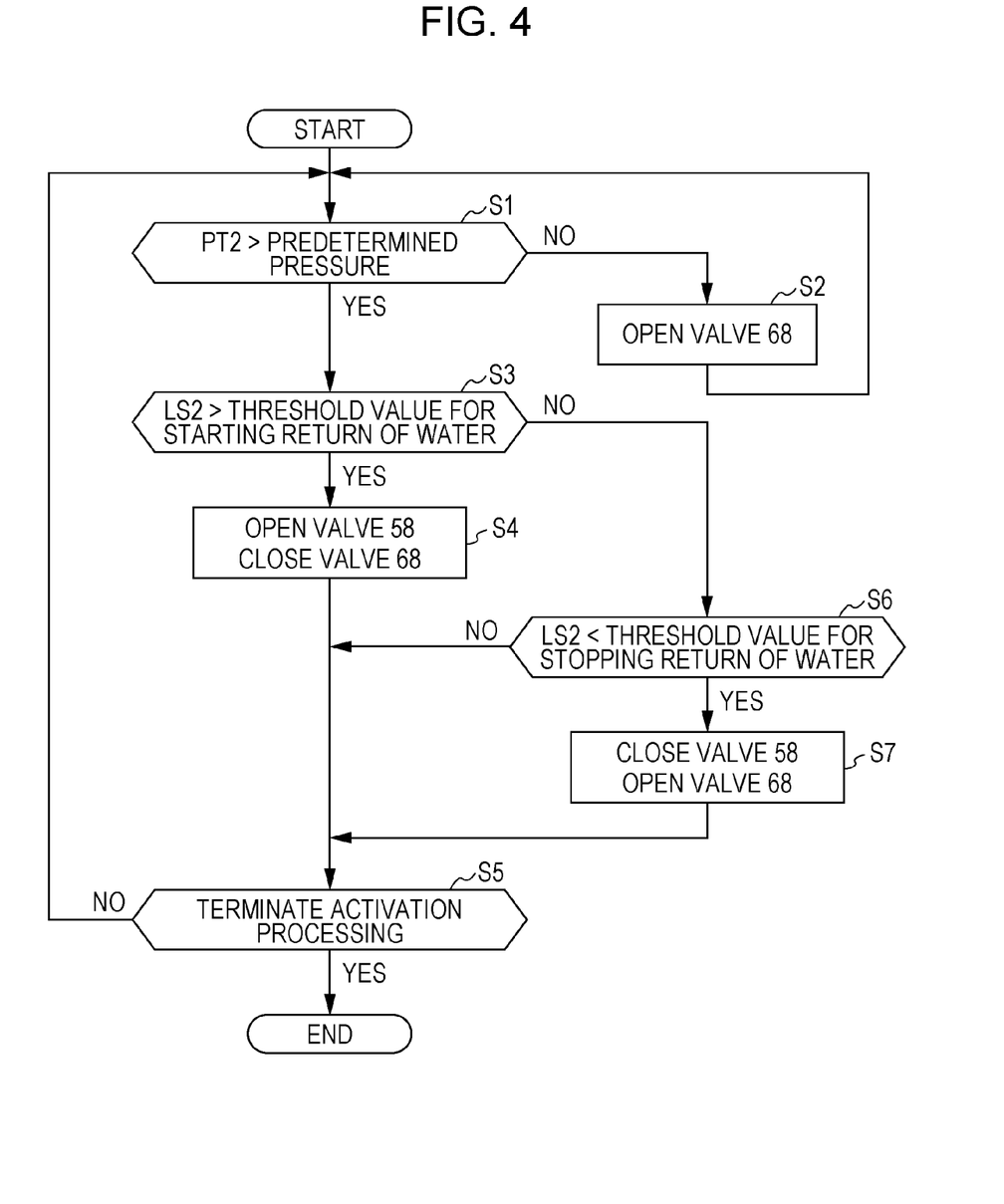
FIG. 4 is a flow chart illustrating an activation method according to the embodiment of the present disclosure.

Subsequently, the activation method according to the present embodiment will be described below with reference to the flow chart illustrated in FIG. 4.

When the high differential pressure water electrolysis system 10 is activated, the pressure PT2 in the low pressure gas-liquid separator 52 is detected by the second pressure gauge 70b. When it is determined that the pressure PT2 is lower than a predetermined pressure (pressure which allows water to return to the water supply tank 28 from the low pressure gas-liquid separator 52) (NO in step S1), the flow proceeds to step S2. In step S2, the third electromagnetic valve 68 is opened, and some midpoint of the hydrogen outlet line 24 and the low pressure gas-liquid separator 52 communicate with each other via the pressure application line 64.

Figure 5:
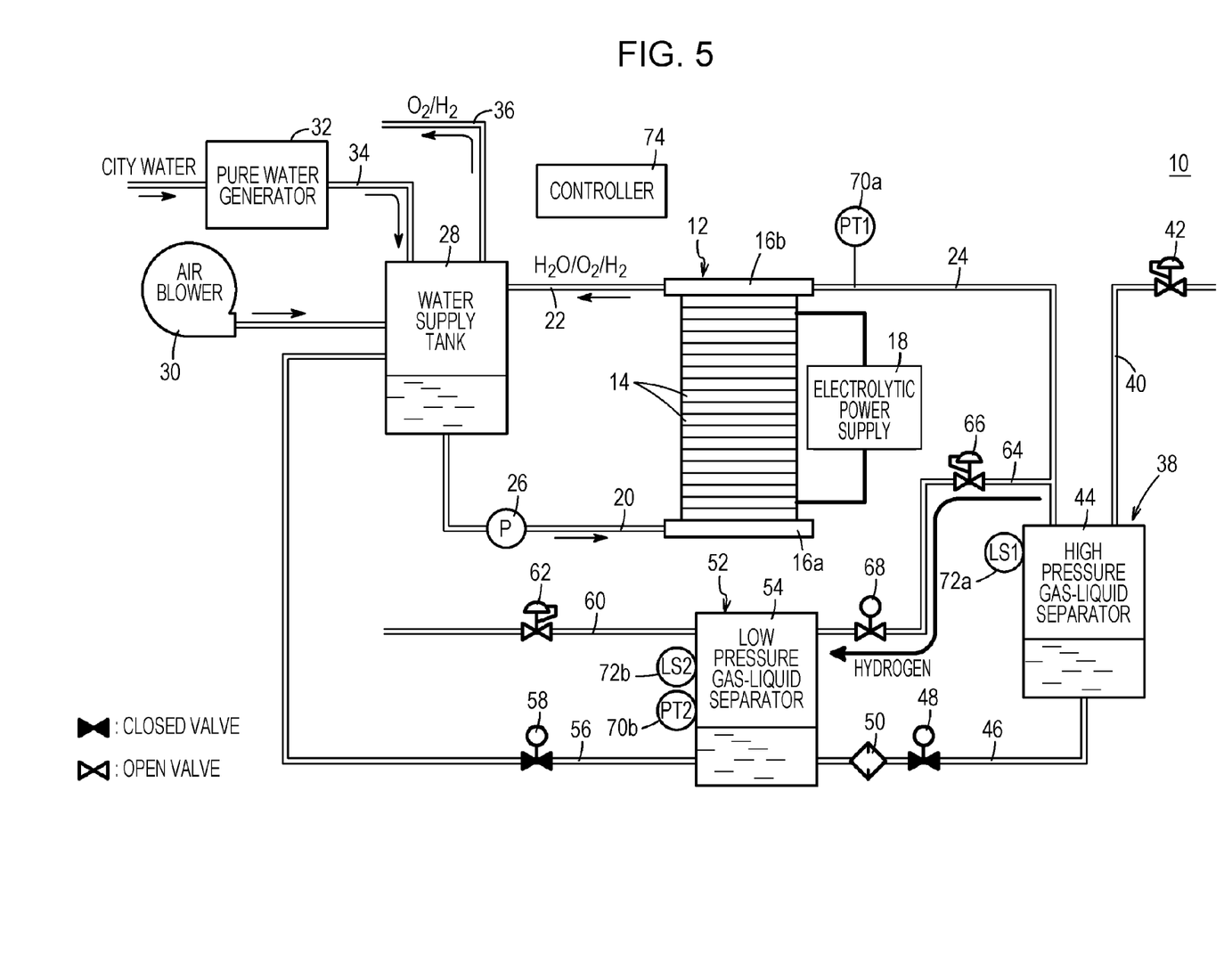
FIG. 5 is an explanatory diagram for the operation of the high differential pressure water electrolysis system at the time of activation.

Thus, as illustrated in FIG. 5, the hydrogen produced by the high differential pressure water electrolysis device 12 is supplied to the low pressure gas-liquid separator 52 from the hydrogen outlet line 24 through the pressure application line 64, and the pressure in the low pressure gas-liquid separator 52 increases. When it is determined that the pressure PT2 is higher than the predetermined pressure (YES in step S1), the flow proceeds to step S3, and it is determined whether or not the water level LS2 in the tank 54 exceeds a threshold value for starting return of water (water level which allows a sufficient amount of water to be supplied to the water supply tank 28).

When it is determined that the water level LS2 in the tank 54 exceeds the threshold value for starting return of water (YES in step S3), the flow proceeds to step S4, and the second electromagnetic valve 58 is opened, whereas the third electromagnetic valve 68 is closed (FIG. 2). Consequently, the water in the low pressure gas-liquid separator 52 is pushed into the water return line 56, and is reliably returned to the water supply tank 28.

When it is determined that the activation processing of the high differential pressure water electrolysis system 10 is not completed (NO in step S5), the flow returns to step S1 and the above-described processing is continued. In step S3, when it is determined that the water level LS2 in the tank 54 is lower than or equal to the threshold value for starting return of water (NO in step S3), the flow proceeds to step S6.

In step S6, when it is determined that the water level LS2 in the tank 54 falls below the threshold value (water level which does not allow water to be supplied to the water supply tank 28) for stopping return of water (YES in step S6), the flow proceeds to step S7. In step S7, the second electromagnetic valve 58 and the third electromagnetic valve 68 are closed. The flow then proceeds to step S5. On the other hand, when it is determined that the water level LS2 in the tank 54 is higher than or equal to the threshold value for stopping return of water (NO in step S6), the flow proceeds to step S5.

In this case, in the present embodiment, when the pressure PT2 in the low pressure gas-liquid separator 52 is lower than the predetermined pressure, high pressure hydrogen output from the high differential pressure water electrolysis device 12 is introduced into the low pressure gas-liquid separator 52 through the pressure application line 64. Thus, the pressure PT2 in the low pressure gas-liquid separator 52 increases and when it is determined that the pressure PT2 is higher than the pressure in the water supply tank 28, the water in the low pressure gas-liquid separator 52 is returned to the water supply tank 28.

Consequently, it is not necessary to use dedicated equipment and the pressure of generated high pressure hydrogen may be utilized. Consequently, the effects are obtained that reuse of water may be achieved easily and cost-effectively, the efficiency of the entire high differential pressure water electrolysis system 10 may be improved, and miniaturization of the high differential pressure water electrolysis system 10 is achieved.

A high differential pressure water electrolysis system according to the present disclosure includes a high differential pressure water electrolysis device, a water supply tank, a high pressure gas-liquid separator, a hydrogen outlet line, a drain line, a drain decompression mechanism, a low pressure gas-liquid separator, and a water return line. The high differential pressure water electrolysis device electrolyzes supplied water to generate oxygen and high pressure hydrogen which is higher in pressure than the oxygen. The water supply tank stores water to be supplied to the high differential pressure water electrolysis device in a circulated manner.

The high pressure gas-liquid separator separates liquid from the high pressure hydrogen output from the high differential pressure water electrolysis device, and the hydrogen outlet line connects the high differential pressure water electrolysis device and the high pressure gas-liquid separator. The drain line drains the liquid water separated by the high pressure gas-liquid separator, and the drain decompression mechanism is disposed on the drain line. The low pressure gas-liquid separator is located downstream of the drain decompression mechanism and is disposed on the drain line, and the water return line connects the low pressure gas-liquid separator and the water supply tank.

In the high differential pressure water electrolysis system, the low pressure gas-liquid separator has a discharge line that discharges gas which has been separated in the low pressure gas-liquid separator. The discharge line is provided with a pressure maintaining mechanism that maintains the pressure in the low pressure gas-liquid separator higher than the pressure in the water supply tank. Thus the water (liquid water in which hydrogen is dissolved) separated from gas in the high pressure gas-liquid separator is decompressed by the drain decompression mechanism and supplied to the low pressure gas-liquid separator. Therefore, the dissolved hydrogen is vaporized in the low pressure gas-liquid separator, and the pressure in the low pressure gas-liquid separator increases. The pressure in the low pressure gas-liquid separator is set to be higher than the pressure in the water supply tank by the pressure maintaining mechanism. Therefore, the water in the low pressure gas-liquid separator is returned to the water supply tank easily and reliably due to a pressure difference. Consequently, it is not necessary to use dedicated equipment such as a pump and the pressure of the dissolved hydrogen may be utilized. Thus, reuse of water may be achieved easily and cost-effectively, and it is possible to achieve improvement in the system efficiency and miniaturization of the entire system.

In the high differential pressure water electrolysis system, it is preferable that the water supply tank has an air blower to dilute a gas component from which liquid is separated in the water supply tank. In this case, it is preferable that the pressure maintaining mechanism is set at a pressure higher than the back pressure that acts on the water supply tank when the air blower drives with maximum performance.

Furthermore, it is preferable that the high differential pressure water electrolysis system has a pressure application line to connect some midpoint of the hydrogen outlet line and the low pressure gas-liquid separator. In this case, it is preferable that the pressure application line is provided with a decompression mechanism and an opening and closing valve, and the outlet pressure of the decompression mechanism is set to be higher than the pressure in the water supply tank.

In addition, the method for starting the high differential pressure water electrolysis system determines whether or not the pressure in the low pressure gas-liquid separator is lower than the pressure in the water supply tank. When it is determined that the pressure in the low pressure gas-liquid separator is lower than the pressure in the water supply tank, the high pressure hydrogen output from the high differential pressure water electrolysis device is introduced into the low pressure gas-liquid separator through the pressure application line.

Subsequently, when it is determined that the pressure in the low pressure gas-liquid separator is higher than the pressure in the water supply tank, the water return line is opened to return the water in the low pressure gas-liquid separator to the water supply tank. Thus, the high pressure hydrogen output from the high differential pressure water electrolysis device is introduced into the low pressure gas-liquid separator through the pressure application line, and thus the pressure in the low pressure gas-liquid separator increases. When it is determined that the pressure in the low pressure gas-liquid separator is higher than the pressure in the water supply tank, the water in the low pressure gas-liquid separator is returned to the water supply tank. Consequently, it is not necessary to use dedicated equipment and the pressure of generated high pressure hydrogen may be utilized. Thus, reuse of water may be achieved easily and cost-effectively, and it is possible to achieve improvement in the system efficiency and miniaturization of the entire system.

In the activation method, it is preferable that the water supply tank has an air blower to dilute a gas component from which liquid is separated in the water supply tank. In this case, it is preferable that the pressure in the low pressure gas-liquid separator is set at a pressure higher than the back pressure that acts on the water supply tank when the air blower drives with maximum performance.

Obviously, numerous modifications and variations of the present invention are possible in light of the above teachings. It is therefore to be understood that within the scope of the appended claims, the invention may be practiced otherwise than as specifically described herein.

What is claimed is:

1. A high differential pressure water electrolysis system comprising:
 a high differential pressure water electrolysis device configured to electrolyze water to generate oxygen and high pressure hydrogen which has a pressure higher than a pressure of the oxygen;
 a water supply tank to store the water to be supplied to the high differential pressure water electrolysis device;

a high pressure gas-liquid separator to separate liquid from the high pressure hydrogen output from the high differential pressure water electrolysis device;

a hydrogen outlet line connecting the high differential pressure water electrolysis device and the high pressure gas-liquid separator;

a drain line to drain a liquid water separated by the high pressure gas-liquid separator;

a low pressure gas-liquid separator disposed in the drain line and having a discharge line via which a gas separated by the low pressure gas-liquid separator is to be discharged;

a water return line connecting the low pressure gas-liquid separator and the water supply tank; and a pressure maintaining mechanism disposed in the discharge line and configured to maintain a pressure in the low pressure gas-liquid separator to be higher than a pressure in the water supply tank.

2. The high differential pressure water electrolysis system according to claim 1, further comprising a drain decompression mechanism disposed on the drain line, the low pressure gas-liquid separator being located downstream of the drain decompression mechanism.

3. The high differential pressure water electrolysis system according to claim 1,
wherein the water supply tank has an air blower configured to dilute a gas component from which liquid is separated in the water supply tank, and
the pressure maintaining mechanism is set at a pressure higher than a back pressure that acts on the water supply tank when the air blower drives with maximum performance.

4. The high differential pressure water electrolysis system according to claim 1, further comprising a pressure application line configured to connect a midpoint of the hydrogen outlet line and the low pressure gas-liquid separator,
wherein the pressure application line is provided with a decompression mechanism and an opening and closing valve, and an outlet pressure of the decompression mechanism is set to be higher than a pressure in the water supply tank.

5. A method for starting a high differential pressure water electrolysis system that includes:
a high differential pressure water electrolysis device configured to electrolyze water to generate oxygen and high pressure hydrogen which has a pressure higher than a pressure of the oxygen;

a water supply tank to store the water to be supplied to the high differential pressure water electrolysis device;

a high pressure gas-liquid separator to separate liquid from the high pressure hydrogen output from the high differential pressure water electrolysis device;

a hydrogen outlet line connecting the high differential pressure water electrolysis device and the high pressure gas-liquid separator;

a drain line to drain a liquid water separated by the high pressure gas-liquid separator;

a low pressure gas-liquid separator disposed in the drain line;

a water return line connecting the low pressure gas-liquid separator and the water supply tank; and a pressure application line connecting a midpoint of the hydrogen outlet line and the low pressure gas-liquid separator, the method comprising:
determining whether or not a pressure in the low pressure gas-liquid separator is lower than a pressure in the water supply tank;

introducing the high pressure hydrogen output from the high differential pressure water electrolysis device into the low pressure gas-liquid separator through the pressure application line when it is determined that the pressure in the low pressure gas-liquid separator is lower than the pressure in the water supply tank; and opening the water return line to return water in the low pressure gas-liquid separator to the water supply tank when it is determined that the pressure in the low pressure gas-liquid separator is higher than the pressure in the water supply tank.

6. The method according to claim 5, further comprising:
providing a drain decompression mechanism in the drain line upstream of the low pressure gas-liquid separator.

7. The method according to claim 5, further comprising:
providing an air blower in the water supply tank, the air blower being configured to dilute a gas component from which liquid is separated in the water supply tank; and setting a pressure in the low pressure gas-liquid separator at a pressure higher than a back pressure that acts on the water supply tank when the air blower drives with maximum performance.

\* \* \* \* \*